(12) United States Patent
Lai et al.

(10) Patent No.: US 8,002,455 B2
(45) Date of Patent: Aug. 23, 2011

(54) LIGHT-EMITTING PANEL

(75) Inventors: Chih-Ming Lai, Miao-Li Hsien (TW); Tse-An Lee, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 216 days.

(21) Appl. No.: 12/261,282

(22) Filed: Oct. 30, 2008

(65) Prior Publication Data

US 2009/0168457 A1 Jul. 2, 2009

(30) Foreign Application Priority Data

Dec. 26, 2007 (CN) .......................... 2007 1 0203421

(51) Int. Cl.
*F21V 7/04* (2006.01)

(52) U.S. Cl. ......... 362/620; 362/293; 362/618; 362/626

(58) Field of Classification Search .................. 362/620, 362/293, 612, 613, 618, 626
See application file for complete search history.

(56) References Cited

U.S. PATENT DOCUMENTS

| | | | | |
|---|---|---|---|---|
| 6,653,798 B2 * | 11/2003 | Guthrie et al. | ............ | 315/200 A |
| 6,745,506 B2 | 6/2004 | Maas et al. | | |
| 7,357,551 B2 * | 4/2008 | Yang et al. | ............... | 362/606 |
| 2001/0026446 A1 * | 10/2001 | Yoshida | ................... | 362/109 |
| 2007/0240346 A1 * | 10/2007 | Li et al. | ..................... | 40/544 |

OTHER PUBLICATIONS

Michael S. Shur, "Solid-State Lighting: Toward Superior Illumination", IEEE, vol. 93, No. 10, Oct. 2005.

* cited by examiner

*Primary Examiner* — Evan Dzierzynski
(74) *Attorney, Agent, or Firm* — Andrew C. Cheng

(57) ABSTRACT

A light-emitting panel (50) includes a first light source (511) for emitting first light of a first single color, a second light source (512) for emitting second light of a second single color and a light guide plate (52). The light guide plate (52) includes a light incident surface (55) for receiving the first and second light and a display surface (53). A plurality of first microstructures (561) and second microstructures (562) are formed at the display surface (53). The first and second microstructures (561,562) are configured for allowing the first and second light to exit therethrough. The first and second microstructures (561,562) are respectively arranged to form a first pattern (58) and a second pattern (59). A first dye material and second dye material are respectively applied to the first and second microstructures (561,562).

12 Claims, 4 Drawing Sheets

LIGHT-EMITTING PANEL

BACKGROUND

1. Technical Field

The disclosure generally relates to a light-emitting panel, and particularly to a light-emitting panel incorporating light-emitting diodes as light source.

2. Description of Related Art

Light-emitting panels are commonly used in luminous signs for advertising purposes. Light of the typical light-emitting panels is provided by a tubular low-pressure mercury-vapor discharge lamp, for example a cold cathode fluorescent lamp (CCFL). However, CCFL is harmful to the environment.

Light emitting diodes (LEDs) have many advantages, such as high luminance, low power consumption, highly compatible with integrated circuits, long-term reliability and environmental friendliness and are widely used as light sources instead of CCFLs, as described in an article entitled "Solid-State Lighting: Toward Superior Illumination" cited in a publication of Proceedings of the IEEE, Vol. 93, No. 10, October, 2005 authored by Michael S. Shur.

U.S. Pat. No. 6,539,656 discloses a light-emitting panel with LEDs. The light-emitting panel includes a light-emitting window and an opposite rear wall. The rear wall has two opposed edge surfaces. At least one of the edge surfaces is light transmitting and associated with a plurality of LEDs. A plurality of deformities is provided in the rear wall for extracting light from the panel via the light emitting window. However, the deformities can only be arranged horizontally or vertically, and the light-emitting panel can only display two different light symbols. As a result, the attractiveness of the light-emitting panel is limited.

Therefore, a light-emitting panel is desired to overcome the above shortcomings.

SUMMARY

The present invention provides a light-emitting panel that can display various and colorful contents. The light-emitting panel includes a first light source for emitting first light of a first single color, a second light source for emitting second light of a second single color and a light guide plate. The light guide plate includes a light incident surface for receiving the first and second light and a display surface. The display surface for total internal reflection of the first and second light thereby blocks the first and second light from exiting therethrough. A plurality of first microstructures and second microstructures are formed at the display surface. The first and second microstructures are configured for destroying the total internal reflection of the first and second light at the display surface and thereby allow the first and second light to exit therethrough. The first and second microstructures are respectively arranged to form a first pattern and a second pattern. A first dye material is applied to the first microstructures for blocking the second light from passing therethrough and allows the first light to pass therethrough. A second dye material is applied to the second microstructures for blocking the first light from passing therethrough and allowing the second light to pass therethrough.

Other advantages and novel features of the present light-emitting sources will become more apparent from the following detailed description of preferred embodiments when taken in conjunction with the accompanying drawings, in which:

DETAILED DESCRIPTION OF THE INVENTION

Figure 1:
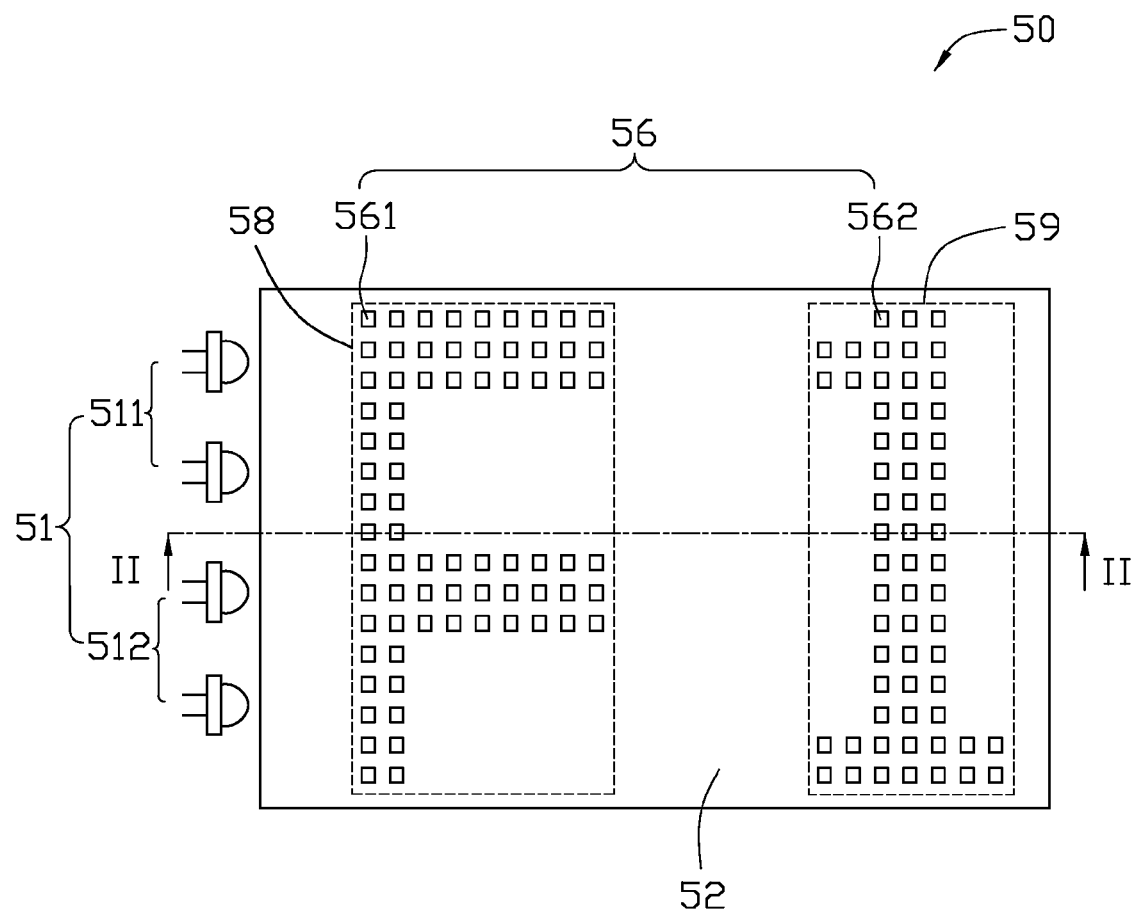
FIG. 1 is a schematic, perspective front view of a light-emitting panel, according to a first present embodiment.

Reference will now be made to the drawing figures to describe the various present embodiments in detail.

Figure 2:
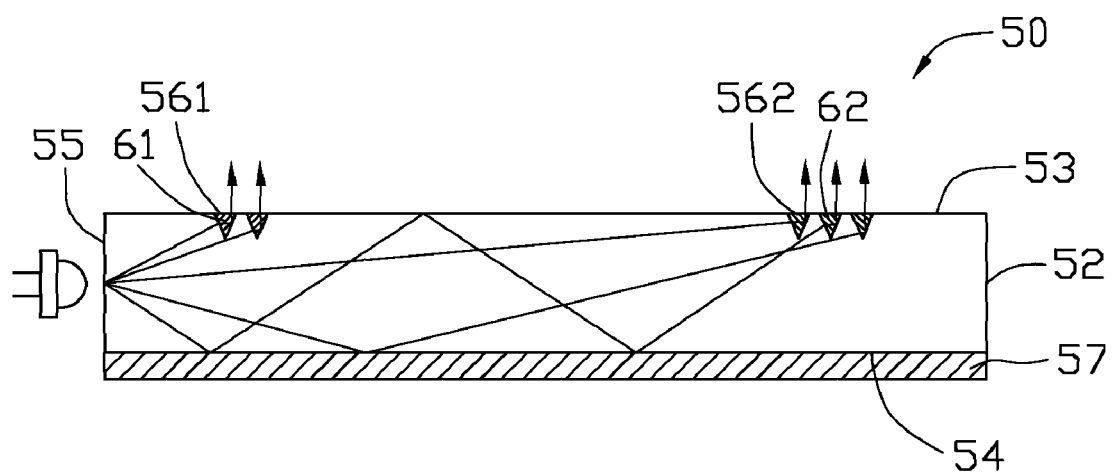
FIG. 2 is a schematic, cross sectional view of the light-emitting panel of FIG. 1, taken along line II-II.

Referring to FIGS. 1 and 2, a light-emitting panel 50 includes a plurality of light sources 51 and a light guide plate 52. The light guide plate 52 is made of light-transmitting materials, such as synthetic resin, silicon, epoxy, quartz, glass, polycarbonate, or polymethymethacry (PMMA). In the illustrated embodiment, the light guide plate 52 has light penetrability of 70% and refractive index of 1.4-1.7. Under the principle of total internal reflection, light is transmitted within the light guide plate 52. The light guide plate 52 has a display surface 53, a rear surface 54 opposite to the display surface 53, and two opposite edge surfaces i.e., left edge surface 55 and right edge surface 52. The display surface 53 is for total internal reflection of the light emitting from the light sources 51 thereby blocks the light from exiting through the display surface 53. The edge surfaces 55, 52 interconnect the display surface 53 and the rear surface 54, respectively. The light sources 51 face the left edge surface 55 and the left edge surface 55 is a light incident surface for receiving the light emitting from the light sources 51. A plurality of microstructures, such as recesses 56, are formed in the display surface 53. The recesses 56 are configured for destroying the total internal reflection of the light emitting from the light sources 51 at the display surface, thereby allowing the light to exit through the display surface 53.

In operation, light emitting from the light sources 51 entries into the light guide plate 52 through the left edge surface 55. In accordance with the principle of total internal reflection, the light continues to move back and forth in the light guide plate 52 until the light is reflected to the recesses 56. As shown in FIG. 2, the rear surface 54 is preferably provided with a reflecting layer 57 made of a material having high reflectivity, such as mercury, silver, or aluminum. The reflecting layer 57 can hold the light emitting from the light sources 51 inside the light guide plate 52.

The light sources 51 can be a plurality of solid-state lightings, for example light-emitting diodes (LEDs), or electro-optic elements. To obtain a high attraction value, the light sources 51 can be power packages of LEDS. The light sources 51 can alternately emit at least two kinds of light of a single color, such as red light, orange light, yellow light, green light, blue light, indigo light, and violet light and etc. In this embodiment, the light sources 51 are divided into a first light source 511 for emitting first light of a first single color and a second light source 512 for emitting second light of a second single color. The first light source 511 is red LED and emits red light. The second light source 512 is yellow LED and emits yellow light. The first and second light source 511, 512 are arranged at a left side of the left edge surface 55 of the light guide plate 52.

The recesses 56 are divided into a first recesses 561 and a second recesses 562. The first recesses 561 and the second recesses 562 are respectively arranged to form a first pattern 58 and a second pattern 59. The first pattern 58 and the second pattern 59 independently form at least a text, graphics, logo, letter, image or combination of the above. A first dye material 61 and a second dye material 62 are respectively applied to the first and second recesses 561, 562. The colors of the first and second dye materials 61, 62 are respectively the same as the colors of the first and second light. Accordingly the first dye material 61 can block the second light from passing through the first dye material 61 and allow the first light to pass through the first dye material 61. The second dye material 62 can block the first light from passing through the second dye material 62 and allow the second light to pass through the second dye material 62. In this embodiment the first and second dye material 61, 62 are respectively red dye material and yellow dye material. The first pattern 58 forms a text "F" and the second pattern 59 forms a numeral "1". The first and second light source 511, 512 can be alternately switched on using a controlling circuit, for emitting red light or yellow light. When the first light source 511 is switched on and the second light source 512 is switched off, the first dye material 61 applied to the first recesses 561 of the first pattern 58 can allow red light to pass through the first dye material 61 and the first recesses 561 can reflect the red light out of the light guide plate 52 so that the red letter "F" formed by the first pattern 58 can be illuminated on the light-emitting panel 50, whereas the second dye material 62 applied to the second recesses 562 of the second pattern 59 blocks red light from passing through the second dye material 62 so that the yellow numeral "1" formed by the second pattern 59 can't be illuminated on the light-emitting panel 50. When the first light source 511 is switched off and the second light source 512 is switched on, the second dye material 62 applied to the second recesses 562 of the second pattern 59 can allow yellow light to pass through the second dye material 62 and the second recesses 562 can reflect the yellow light out of the light guide plate 52 so that the yellow numeric "1" formed by the second pattern 59 can be illuminated on the light-emitting panel 50, whereas the first material 61 applied to the first recesses 561 of the first pattern 58 absorbs yellow light so that the red letter "F" formed by the first pattern 58 can't be illuminated on the light-emitting panel 50. In the above-mentioned embodiment, the first and second pattern 58, 59 (for example the letter "F" and the numeral "1") can be selectively made to light up/display on the light-emitting panel 50. Thus it is possible to alternately display the first pattern 58 and the second pattern 59 on a single light guide plate 52. Furthermore, when the first light source 511 and the second light source 512 are switched on at the same time, the first and second pattern 58, 59 can be simultaneously illuminated on the light-emitting panel 50. The patterns can be more than three, so the light-emitting panel 50 can display various and colorful information.

Figure 3:
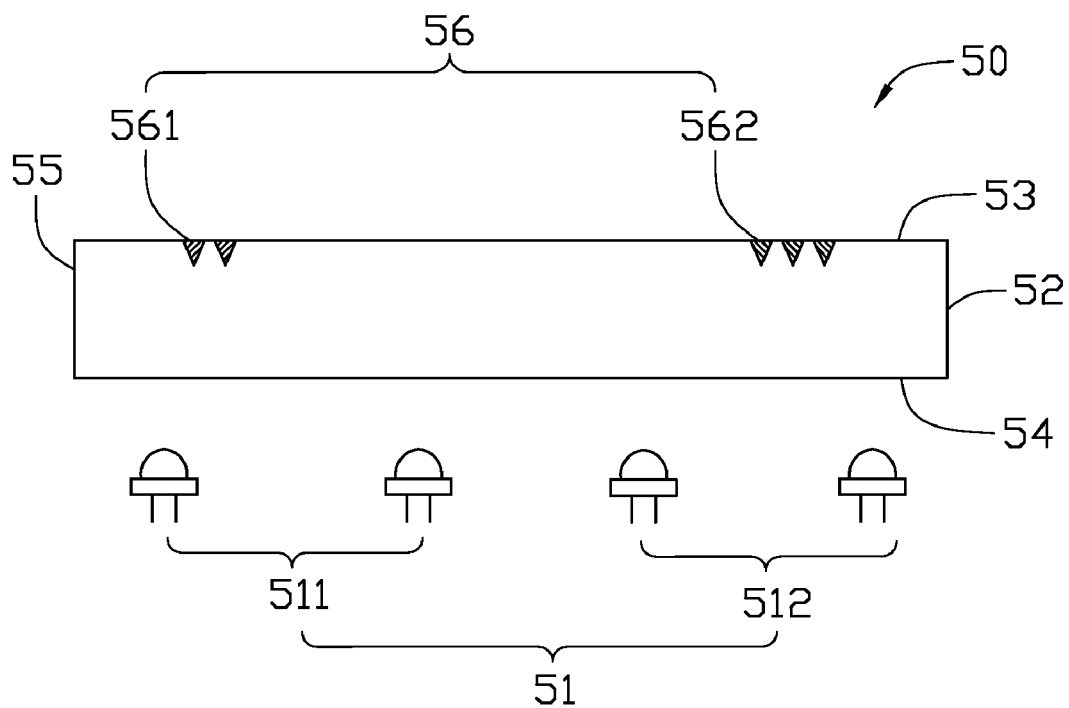
FIG. 3 is a schematic, cross sectional view of the light-emitting panel, according to a second embodiment.

FIG. 3 shows an alternative embodiment. The difference of this embodiment from the previous embodiment is as follows. The light sources 51 face the rear surface 54 and the rear surface 54 is a light incident surface for receiving the light emitting from the light sources 51.

Figure 4:
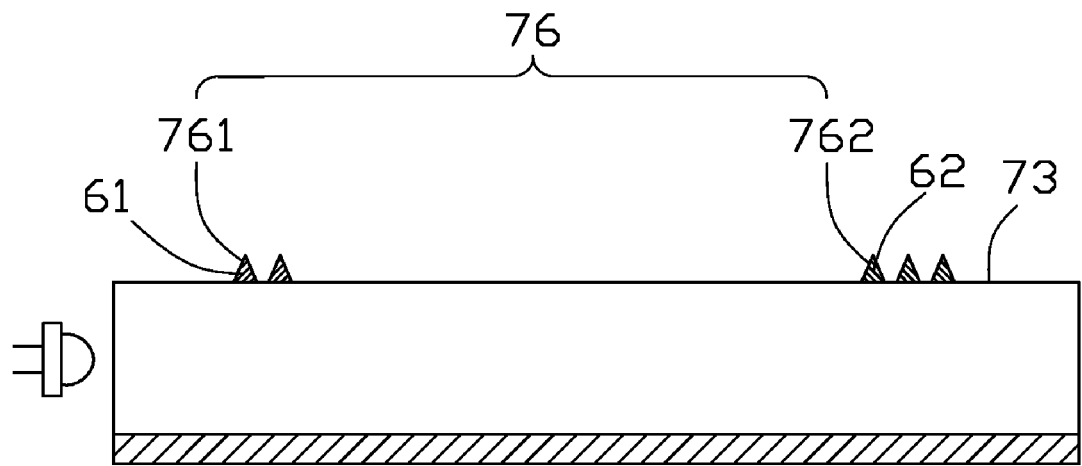
FIG. 4 is a schematic, cross sectional view of the light-emitting panel, according to a third embodiment.

Referring to FIG. 4, a third embodiment is shown. The difference of this embodiment from the previous embodiment is as follows. The microstructures are protrusions 76 extending outwardly from the display surface 73. The protrusions 76 are divided into a plurality of first protrusions 761 and a plurality of second protrusions 762. The first and second dye material 61, 62 are respectively applied to the first and second protrusions 761, 762.

It will be obvious that, within the scope of the invention, many variations are possible to those skilled in the art. The scope of protection of the invention is not limited to the example given herein. For example, the microstructures can be a combination of the recesses and the protrusions. The number of edge surfaces of the light guide panel 52 may be more than four. The shape of each of the microstructures is chosen from a group consisting of a pyramid, a cone, a cube and a hemisphere. The edge surfaces except the light incident surface can be provided with a specularly reflecting surface.

What is claimed is:

1. A light-emitting panel comprising:
   a first light source for emitting first light of a first single color;
   a second light source for emitting second light of a second single color;
   a light guide plate comprising
       a light incident surface for receiving the first and second light,
       a display surface for total internal reflection of the first and second light, thereby blocking the first and second light from exiting through the display surface;
       a plurality of first microstructures formed at the display surface, the first microstructures being configured for destroying the total internal reflection of the first and second light at the display surface, thereby allowing the first and second light to exit through the display surface, the first microstructures being arranged to form a first pattern;
       a first dye material applied to the first microstructures for blocking the second light from passing through the first dye material and allowing the first light to pass through the first dye material;
       a plurality of second microstructures formed at the display surface, the second microstructures being configured for destroying the total internal reflection of the first and second light at the display surface, thereby allowing the first and second light to exit through the display surface, the second microstructures being arranged to form a second pattern; and
       a second dye material applied to the second microstructures for blocking the first light from passing through the second dye material and allowing the second light to pass through the second dye material.

2. The light-emitting panel of claim 1, wherein the first and second microstructures are selected from a group consisting of recesses, protrusions, and a combination of the recesses and protrusions.

3. The light-emitting panel of claim 1, wherein the shape of each of the first and second microstructures is chosen from a group consisting of a pyramid, a cone, a cube and a hemisphere.

4. The light-emitting panel of claim 1, wherein the colors of the first and second light are respectively the same as the colors of the first and second dye material.

5. The light-emitting panel of claim 1, wherein the light incident surface is opposite to and parallel to the display surface.

6. The light-emitting panel of claim 1, wherein the light incident surface perpendicularly adjoins the display surface.

7. A light-emitting panel comprising:
   a first light source for emitting first light of a first single color;
   a second light source for emitting second light of a second single color;

a light guide plate comprising
- a light incident surface for receiving the first and second light,
- a display surface for total internal reflection of the first and second light, thereby blocking the first and second light from exiting through the display surface;
- a plurality of first microstructures formed at the display surface, the first microstructures being configured for destroying the total internal reflection of the first and second light at the display surface, thereby allowing the first and second light to exit through the display surface, the first microstructures being arranged to form a first pattern;
- a first dye material applied to the first microstructures for blocking the second light from passing through the first dye material and allowing the first light to pass through the first dye material;
- a plurality of second microstructures formed at the display surface, the second microstructures being configured for destroying the total internal reflection of the first and second light at the display surface, thereby allowing the first and second light to exit through the display surface, the second microstructures being arranged to form a second pattern;
- a second dye material applied to the second microstructures for blocking the first light from passing through the second dye material and allowing the second light to pass through the second dye material; and
- a controlling circuit for controlling turning on/off of the first light source and the second light source.

8. The light-emitting panel of claim 7, wherein the first and second microstructures are selected from a group consisting of recesses, protrusions, and a combination of the recesses and protrusions.

9. The light-emitting panel of claim 7, wherein the shape of each of the first and second microstructures is chosen from a group consisting of a pyramid, a cone, a cube and a hemisphere.

10. The light-emitting panel of claim 7, wherein the colors of the first and second light are respectively the same as the colors of the first and second dye material.

11. The light-emitting panel of claim 7, wherein the light incident surface is opposite and parallel to the display surface.

12. The light-emitting panel of claim 7, wherein the light incident surface perpendicularly adjoins the display surface.

* * * * *